P. C. HEWITT.
SYSTEM OF ELECTRICAL DISTRIBUTION.
APPLICATION FILED JULY 11, 1911.
1,314,592. Patented Sept. 2, 1919.
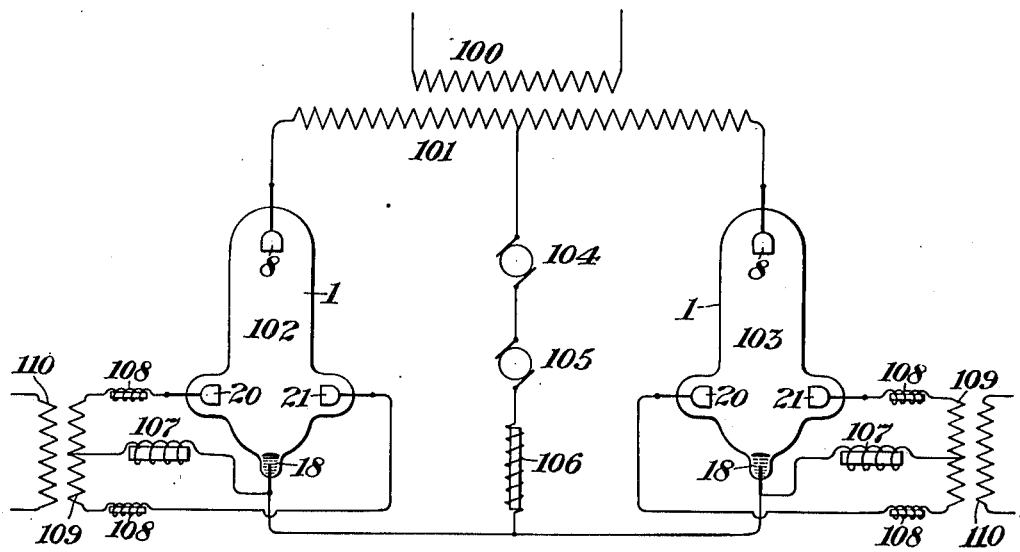
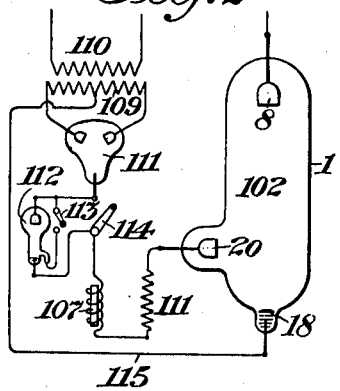
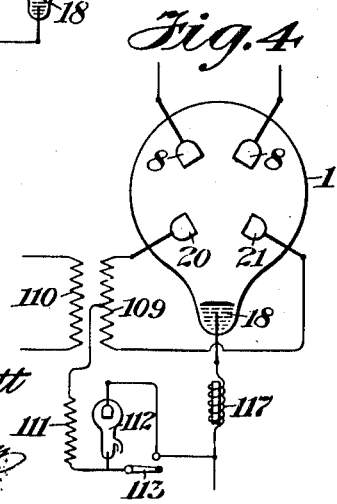
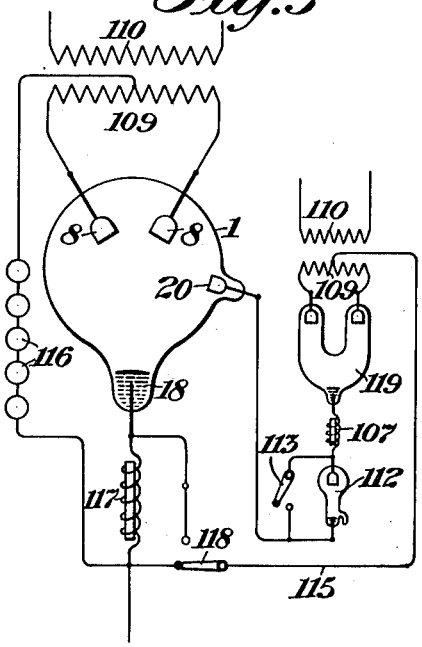
WITNESSES:
Chas. J. Clagett
Thos. A. Brown
INVENTOR
Peter Cooper Hewitt
BY
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

SYSTEM OF ELECTRICAL DISTRIBUTION.

1,314,592.        Specification of Letters Patent.      Patented Sept. 2, 1919.

Application filed July 11, 1911. Serial No. 637,950.

*To all whom it may concern:*

Be it known that I, PETER COOPER HEWITT, a citizen of the United States, and resident of Ringwood Manor, county of Passaic, State of New Jersey, have invented certain new and useful Improvements in Systems of Electrical Distribution, of which the following is a specification.

My invention relates to certain circuits and apparatus related to rectification, transmission or control of electric current.

The essential features of my apparatus which is often known as vapor apparatus are an anode that will withstand change of state and chemical change during operation, a cathode of such nature and in such surroundings as to be capable of reconstruction under electrical disintegration, inclosed in an exhausted container and insulated as to the container one from the other. A conducting liquid serves well as a cathode. Certain features or characteristics adapted for the application of this type of apparatus to the rectification of alternating current of relatively large power and some other uses are important. When used for large power special forms of rectifying structures are useful, and I have set forth a number of such structures in my co-pending application, Serial Number 600,443, filed January 3rd, 1911, and other applications and patents granted to me to which reference is made for further description of the subject matter of the present invention.

As is well known the underlying characteristic of this rectifier is the negative electrode reluctance to starting which phenomenon must be maintained at the positive and must be overcome at the acting negative for starting and maintained in a passive condition under certain normal voltage conditions for operation. While it is found feasible and sometimes convenient to utilize the main current to produce the requisite continuity of current flow into the cathode, yet for many lines of important work such, for example, as electric operation of railroads by alternating current, electric transmission of power, hoisting operations, steel rolling mills, &c., it may be desirable to permit discontinuous flow of main current at will without requiring repeated starting of current flow in the cothode. In large capacity devices, a plurality of rectifiers is useful where more than one phase of main current is depended upon, each rectifier having but a single main anode and separate exciting source.

As a means of continuous excitation one or more supplemental anodes coöperating with the main cathode has been utilized in a device together with some suitable connections for supplying current thereto. Under these conditions the main flow of current may be accidentally transferred from the main cathode to one of such auxiliary anodes. One object of this invention is to provide means to avoid the above by the utilization of an auxiliary rectifier inserted between a supplemental anode and its supply connections. Means and circuits are shown in the accompanying drawings.

Figure 1 represents a single phase system utilizing both alternations of the supply for feeding a direct current work circuit; Fig. 2 represents modifications of the cathode exciting means of Fig. 1 adapted to prevent transfer of the current from the cathode; Fig. 3 shows a similar system involving, however, a single rectifier with two main anodes; Fig. 4 a modified form of Fig. 3.

Referring more particularly to the drawings in Fig. 1, 100 is the primary of a main supply primary and 101 its secondary which is provided with two terminals and a connection at an intermediate point. Direct current motors 104 and 105 which may or may not be controlled by impedance 106 are fed with rectified current from both alternations of the supply potential impressed upon the primary 100 through two mono-phase rectifiers 102 and 103. Each of these rectifiers comprises an exhausted container 1, a main anode 8, a main cathode 18 and two supplemental anodes 20 and 21. The supplemental anodes are supplied with alternating current from a small supply transformer having a primary 110 with a secondary 109. Impedance coils 108, 108 may be inserted between supplemental anodes 20 and 21 and the terminals of the secondary 109. These coils, 108, in virtue of the power of their inductance to maintain the flow of current in a given direction serve to prevent the flow of current which normally passes from the main anode to the main cathode from taking a path from the main anode to a supplemental anode and returning to the main circuit through the exciting circuit as sometimes occurs in other systems. To steady the flow of current in the keeping alive circuit due to variations in the voltage and in circuit resistance, it is desirable to have a considerably higher voltage applied than is absorbed in keeping the vapor device alive in order that stability may be obtained and for this purpose it is necessary to have a voltage absorbing device of the general nature of an impedance inserted in the circuit. The coils, 108, serve this purpose, and thus have a regulating function. The lead of the cathode 18 is connected through an impedance or choke coil 107 to an intermediate point of the secondary 109. This coil, 107, serves to steady the flow of current, to prevent the transfer of normal current flow from the main cathode, 18, to a supplemental anode, as 20, and to partially absorb the voltage of the transformer 109, existing over and above the voltage necesary to maintain current flow in the rectifier itself. Thus the functions of the coil, 107, are largely similar to those of the coil, 108. The primary winding 110 may be supplied, if desired, from the source of main current or other source of different frequency from the primary 100.

In the system shown the advantage of the use of two rectifiers 102 and 103 will be recognized for many reasons, the general simplification of structure, the added opportunity for radiation of heat and simplicity and general symmetry.

It should also be noted that the impedances 107 and 108 will serve to a considerable degree to prevent by their inertia action the transfer of the main flow of current from the cathode 18 to either anode 20 or 21.

The operation of the system of Fig. 1 may be briefly described as follows: The alternations from the supply produce similar alternations of potential upon the secondary 101 and those impulses which are directed in a right hand direction in the secondary 101 will traverse the rectifier 103 from the anode 8 to the cathode 18 passing to the motors 104 and 105 returning to the intermediate point in the terminal 101. Similarly impulses directed in a left handed direction in the secondary 101 will traverse the rectifier 102 passing from the main anode 8 to the main cathode 18 and thence through the motors to the secondary 101 as before. These impulses are obviously in the same direction in the receiving circuit and the supply currents have been rectified. The flow of current through the rectifiers is possible in view of the excitation of the cathodes 18 by the auxiliary electrodes and the systems supplying current thereto already described. The anodes 8, 8 prevent the flow of reverse current, from 18 to 8. It is obvious that, should there be a momentary tendency for the main flow of current to pass from the main anode 8, to the supplemental anode 20, the devices 107, 108 would strongly resist and prevent such flow.

During the quiescent period of the rectifier 102 no current would be flowing therein from the main anode 8 as the alternate impulse passes through the rectifier 103. Thus the rectification of the several sets of current impulses is kept separate and each free from large current flow during its inactive alternation. For example if the main motors operated at 600 volts each and required 500 amperes, thus consuming approximately 300 kilowatts and if the exciting current through the main cathode 18 and through the supplemental anodes 20 and 21 be 3 amperes, which might be a suitable value, it will be seen that during the inactive alternations the anode 8 of this rectifier is practically free from the influence of simultaneous current flow. In other words, the tendency of the presence of the main current flow to one anode, in each vapor electric rectifier to cause short circuiting or arcing on the other main anode, which is then suppressing wrongly directed current flow, is avoided in Fig. 1, since when the main flow of current is taking place in one rectifier, the anode which is resisting the reverse flow of current is in the other rectifier and is thus undisturbed by any effect from the main current then actually flowing which is simultaneously operating but in the other rectifier. Similarly with the rectifier 103.

Referring to Fig. 2 the similarly numbered parts have the same functions as the various elements of Fig. 1. In this case there is but one supplemental anode in the rectifier 102. This anode passes direct current to the cathode 18, which direct current is derived from the transformer secondary 109 through a resistance 111. The transformer winding 110 supplies the energy to the secondary 109, the choke coil 107 and the resistance 111 may be used to steady and control the direct exciting current and serve to prevent current flow from the electrode 8 into this circuit. A vapor device 112 may be inserted between the cathode of the rectifier 111 and the supplemental anode 20 which will pass current in only one direction which will prevent the reversal of flow of current in the anode 20 as would occur by the transfer of the main current flow from the cathode 18 to it. The effect, which is very marked in very high voltage rectifiers, and in which current that has been normally flowing from the main anode to the main cathode suddenly transfers itself from this cathode to a supplemental anode causing the latter to act as a cathode, is a difficult one to suppress, especially since the main voltage may be many thousands and the voltage on the supplemental electrodes which receives such undesired transfer may be less than 100 volts. The device, 112, which is in one sense physically a direct current device will be very effective in preventing the reversal of direction of current flow which results from such a transfer of the negative to the supplemental anode, for as long as current flow continues in the right direction all goes quietly but once this flow in this direction is stopped in the device 112, it would go out and an enormous voltage would be required to start current flow backward. The device, 112, (see Figs. 2 and 3) here acts as a fortifier or duplicate alternative of the device, 119, which also has the power to resist the transfer of the main cathode to the supplemental anode in a manner similar to that just described for the device 112. In starting the device 112, the switch 113 may be closed and the apparatus shaken and started in the usual manner by opening the switch. The switch 114 serves for cutting out the device 112 when not needed or may be used when starting the rectifier 111. As is shown the lead of the cathode 18 is connected to an intermediate point in the transformer secondary 109. Generally the operation of Fig. 2 is similar to that of Fig. 1, and many of the same advantages of operation are attained therein.

Fig. 3 shows an organization of circuits and apparatus serving somewhat similar purposes to Fig. 1, but utilizing a single main rectifier for handling currents from all the terminals of the supply secondary. The main anodes are shown at 8, 8 and the cathode at 18. The supplemental anode 20 serve for exciting and starting purposes. The load circuit is here shown at 116 containing devices which may be lamps, motors, storage batteries, electrolytic cells, or any other of the many forms of apparatus adapted to utilize electric current. In this figure the keeping alive circuit is supplied from the transformer primary 110 energizing the secondary 109 which in turn feeds the exciting rectifier 119. From the cathode of the rectifier 119 is run the connection to the supplemental anode 20, this connection including a choke coil 107 and a second vapor electric apparatus 112 serving, if desired, as an additional safe guard against the reversal of current by the transfer of the main flow from the cathode 18 to the anode 20. This device 112 may be short circuited by the switch 113.

The device 119 in this case is formed of a U-shaped tube with the solid anodes at the extremities, and the cathode at the bend of the U. A return connection from the main cathode 18 to the intermediate point of the secondary 109 may be tapped off the main rectified circuit as shown either at the lead of the cathode between it and the coil 117 or at the lead of the latter coil remote from the cathode, as shown in the drawing. By throwing the switch 118 the former connection is established. In the connection as shown the exciting current traverses the coil 117. This coil serves as a sustaining and steadying means for the rectified current.

It will not be necessary to here repeat the description of the parts numbered similarly to corresponding parts in the other figures. The operation and special features of Fig. 3 will be obvious from this description and from what has been said about the other figures.

Fig. 4 is a variation from Fig. 3 and shows the use of two supplemental anodes for exciting current, being somewhat similar in this feature to the exciting circuits for the rectifiers of Fig. 1. In this case the single container 1, serves practically to do the rectifying both for the main and the exciting current. With this arrangement the protective device 112, which is similar to that shown in the other figures, is connected in the lead between the intermediate points of the transformer secondary 109 and the main lead of the circuit of the rectified current. As before this may be cut out for starting or other purposes by the switch 113. The various parts hereto serve substantially the same functions as in the similarly numbered parts of the other figures and the operations of Fig. 4 have been substantially set forth in what has already been said in the present specification or will be evident upon consideration.

Applicant considers his invention to be a broad one, and has endeavored so to describe it and does not intend to limit it to the specific circuits and devices shown. It is intended to cover all uses of the arrangements shown and equivalent devices which utilize the same process or the same means.

It is perfectly obvious that while only a single phase source is illustrated, a number of features of the invention are just as applicable to poly-phase circuits, and it is applicant's intention to cover such application. For example the device 112 or the exciting systems broadly could be applied without change to the poly-phase systems. Similarly a system similar to Fig. 1, but having three or more rectifiers and exciting circuits can be utilized for operation with a three-phase supply. In this case the advantages of the increased radiation and other features set forth, which are inherent in the apparatus, will be perfectly attainable. Devices such as shown may also be operated in parallel to secure greater capacity.

I claim as my invention—

1. In a system of electrical distribution, the combination with a plurality of points of alternating supply, and a direct current receiving circuit, of a plurality of monophase rectifiers, each including an exhausted container, a main anode and a main cathode of reconstructing material, connections from the several points of supply to the main anodes, and from the several cathodes through a common lead to the positive side of the receiving circuit, supplemental anodes in each of said rectifiers, connections from points of the supply to each of said supplemental anodes, a connection from the cathode of each rectifier to an intermediate point of the alternating supply, and current-sustaining means in the circuit between the cathode and the supplemental anodes.

2. In a system of electrical distribution, the combination with a plurality of points of alternating supply, and a direct current receiving circuit, of a plurality of monophase rectifiers, each including an exhausted container, a main anode and a main reconstructing cathode, connections from the several points of supply to the main anodes, and from the several cathodes to the positive side of the receiving circuit, and means for independently exciting the negative of the several rectifiers comprising supplemental anodes in each of said rectifiers, connections from points of the supply to each of said supplemental anodes, a connection from the cathode of each rectifier to an intermediate point of the alternating supply, and current-sustaining and regulating means in the circuit between the cathode and the supplemental anodes.

3. Means for exciting a mono-phase rectifier, said rectifier including an exhausted container, a reconstructing cathode and a plurality of supplemental anodes, said means consisting of a separate transformer secondary connected across said supplemental anodes and a connection from the cathode lead to an intermediate point of said transformer secondary, together with suitable sustaining and regulating means, comprising relatively large impedance coils in the leads of said rectifier.

4. The combination with a mercury vapor rectifier comprising an exhausted container, a reconstructing cathode, a main anode and a supplemental anode therein, of means for exciting said cathode, said means consisting of an alternating supply, a mercury vapor rectifier fed therefrom comprising an exhausted container and suitable electrodes therefor, connections from the cathode thereof to said supplemental anode, means for sustaining the operation of said last named rectifier and a connection from the lead of said first named cathode to an intermediate point of said alternating supply.

5. The combination with a rectifier comprising an exhausted container, a reconstructing cathode, a main anode and a supplemental anode therein, of means for exciting said cathode, said means consisting of an alternating supply, a second rectifier fed therefrom comprising an exhausted container and suitable electrodes therefor, connections from the cathode thereof to said supplemental anode, means for maintaining the operation of said last named rectifier and a connection from the lead of said first named cathode to an intermediate point of said alternating supply, together with a vapor device in series with the cathode lead of said second rectifier, said device comprising an exhausted container and electrodes therefor, one being a reconstructing cathode.

6. In a system of electrical distribution, the combination with a rectifier comprising an exhausted container, a main anode and a cathode and a plurality of supplemental anodes therein, of a source of single phase current connected across said supplemental anodes, a connection from an intermediate point of said source to the lead of said cathode, a device in said connection permitting the passage of current in one direction only, and an inductance coil connected between said cathode and said connection.

7. In a system of electrical distribution, the combination with a rectifier comprising an exhausted container, a main anode and a cathode and a plurality of supplemental anodes, of a source of single phase current connected across said supplemental anodes, a connection from an intermediate point of said source to the lead of the cathode and a device in said connection permitting the passage of current in one direction only.

Signed at New York in the county of New York and State of New York this 7th day of July A. D. 1911.

PETER COOPER HEWITT.

Witnesses:
L. A. COLEMAN,
R. A. HEWITT.